(12) United States Patent
Wang et al.

(10) Patent No.: US 7,805,622 B2
(45) Date of Patent: Sep. 28, 2010

(54) PLUGGABLE TRANSCEIVER MODULE

(75) Inventors: Xiaozhong Wang, Sunnyvale, CA (US); Edmond Lau, Sunnyvale, CA (US); Bill Lau, Dale City, CA (US)

(73) Assignee: Emcore Corporation, Albuquerque, NM (US)

( * ) Notice: Subject to any disclaimer, the term of this patent is extended or adjusted under 35 U.S.C. 154(b) by 709 days.

(21) Appl. No.: 11/698,550

(22) Filed: Jan. 26, 2007

(65) Prior Publication Data

US 2008/0184053 A1 Jul. 31, 2008

(51) Int. Cl.
*G06F 1/00* (2006.01)
(52) U.S. Cl. .................................................. 713/300
(58) Field of Classification Search ................ 713/300
See application file for complete search history.

(56) References Cited

U.S. PATENT DOCUMENTS

| | | | |
|---|---|---|---|
| 6,947,272 B2 * | 9/2005 | Daniels et al. ............. 361/93.9 |
| 7,243,058 B1 * | 7/2007 | Du et al. ........................ 703/13 |
| 7,371,014 B2 * | 5/2008 | Willis et al. .................... 385/89 |
| 2003/0128411 A1 | 7/2003 | Aronson et al. | |
| 2005/0276547 A1 * | 12/2005 | Wang et al. .................... 385/92 |
| 2005/0286902 A1 | 12/2005 | Pierce et al. | |
| 2006/0156045 A1 * | 7/2006 | Galles ......................... 713/300 |
| 2008/0005386 A1 * | 1/2008 | Matsuda et al. ............... 710/22 |

* cited by examiner

*Primary Examiner*—Thomas Lee
*Assistant Examiner*—Mohammed H Rehman

(57) ABSTRACT

A pluggable module connected to the backplane or other connection interface of an information system unit so as to provide additional functionality thereto (such as a communications interface to an electrical or fiber optics cable), and arranged to draw electrical power from the system. In order to prevent excessive in-rush current on connection, the module is provided with power control circuitry which is adapted to incrementally increase the supply voltage to components within the module in a manner so as to avoid power supply glitches in the system, such as a substantial voltage drop, and/or excessive current flow.

15 Claims, 7 Drawing Sheets

PLUGGABLE TRANSCEIVER MODULE

BACKGROUND OF THE INVENTION

1. Field of the Invention

The present invention relates to a pluggable transceiver module for releasable connection to a base unit in a computer network, and in particular a pluggable module which has power control circuitry which can be used to adjust the supply voltage supplied to at least a subset of components within the module. The invention also relates to a combination comprising such a pluggable transceiver module and a base unit into which it may be releasably connected.

2. Description of the Related Art

Pluggable transceiver modules are used extensively in large router and switching systems, in information storage systems, data communication networks, as well as other systems. It is usually intended that such modules are able to be inserted into the receiving interface for the module in the router or switch base unit without disrupting any other modules which may be connected to the base unit, or disrupting the base unit itself. However, many pluggable modules, and in particular those containing low voltage components with associated large capacitors, can, if not properly designed, draw a large amount of in-rush current at the moment of connection to a system. This large in-rush current can cause a momentary drop in the base unit power supply voltage, causing glitches in the power supply of the base unit into which the module has been plugged. Such glitches can cause other boards or modules connected to the unit to malfunction, and in a worst case can cause complete system shutdown. Such problems are known already in the art, and are described for example by Huat, C. L. "*Low Voltage Hot Swap Controller With In-rush Current Control*", Linear Technology Magazine, May 2005, pages 17 to 19.

In addition, as well as causing problems in a unit into which a pluggable module is plugged, the large in-rush current which can occur can also damage components within the module itself.

As noted above, the problem of a large in-rush current causing power supply problems in the base unit into which a pluggable module is connected is known in the art, and prior solutions to this problem have been to provide dedicated chips, for example the LTC 4216, Maxim 5924 or Maxim 5918. For example, the LTC 4216 chip available from Linear Technology Corporation, 1630 McCarthy Boulevard, Milpitas, Calif. 95035-7417 provides for controllable in-rush current control by the provision of a "soft start" feature, which ramps a supply voltage $V_{out}$ from 0 v to a required level for the supply of components provided on a board on which the chip is incorporated. Only the rate at which the voltage ramps upwards can be controlled using the LTC 4216, and no more complicated ramp-up profiles are supported. Moreover, the LTC 4216 has typically not been widely used in pluggable module applications, because it requires a relatively large area of PCB space for itself and its supporting components. The additional PCB space thus required can be very hard to accommodate in high density designs, which are almost always used for small pluggable modules. Typically, the LTC 4216 provides a power on voltage ramp of the supply voltage $V_{out}$ over a time period of approximately 150 to 200 milliseconds.

Whereas the LTC 4216 chip is a dedicated chip aimed at the problem of reducing in-rush current when a board is inserted into a backplane, other less complicated chips are also available which provide a non-controllable voltage ramp feature on start-up, but which typically is performed too quickly to prevent the problems noted above. One example of such a chip is the LTC 3026 voltage regulator, again available from Linear Technology Corporation. The LTC 3026 is a voltage regulator chip which can be used to provide a low voltage supply to low voltage components. The LTC 3026 includes a built in, uncontrollable "soft start" feature, which ramps up the voltage $V_{out}$ supplied from the regulator over a period of approximately 200 microseconds. However, this degree of start up ramp is often too short a time period to avoid the problems of in-rush current noted above.

The Multiple Source Agreements (MSAs) associated with optical transceiver modules such as XENPAK (see www.x-enpak.org) also provide requirements such as the "Inrush current during hotplug", which for XENPAK MSA Section 10.4 is listed as a maximum of 50 mA/ms.

Prior to the present invention, it has not been possible to meet such specifically defined requirements in pluggable transceiver modules.

SUMMARY OF THE INVENTION

It is an object of the present invention to provide a pluggable module for use in an information system to draw power from the host system when plugged in a programmably adjustable manner.

It is also another object of the present invention to provide a module for use in an optical fiber transmission system with means for slowly ramping up the power level in such module when plugged into the host unit.

It is still another object of the present invention to provide an optical transceiver with a programmed-microprocessor to control the ramp-up time of a voltage converter in such transceiver.

It is still another object of the present invention to provide a feature in an electronic module for converting between serial and parallel electrical format, for permitting an adjustable power ramp-up to the module.

It is another object of the present invention to provide a transceiver for use in a data transmission system with a programmable power ramp-up circuit to prevent voltage drop in the host system when the transceiver is activated.

Some implementations or embodiments may achieve fewer than all of the foregoing objects.

Briefly, and in general terms, the present invention provides a pluggable module which may be connected to the backplane or other connection interface of a unit so as to provide additional functionality thereto, the pluggable module being arranged to draw electrical power from the unit. In order to prevent excessive in-rush current on connection the module is provided with power control circuitry which is adapted to incrementally increase the supply voltage to components within the module in a manner so as to avoid power supply glitches in the unit into which it is plugged, such as a substantial voltage drop, and/or excessive current flow.

Additionally, the invention also provides an electro-optical module including electronic components powered from an external power source, comprising: a connector in said module including a power line for receiving power from an external source; a power control in said module having an input connected to said power line and an output, wherein the power control detects when power is applied to said input and produces an output voltage on said output that gradually increases from zero at the time power is applied to said input to the voltage level of said input after a predetermined period of time.

Within preferred embodiments the pluggable module is a module adapted for the transfer of information, and in particular in the form of an optical signal. Particularly preferred embodiments relate to pluggable modules which perform the conversion of information signals between the electrical and optical domains. Such modules are commonly used within communications networks, and are adapted to connect to a switch or router within such a network so as to provide optical links between nodes within the network.

The power control circuitry within a module according to an embodiment of the invention preferably adjusts the supply voltage to the components within the module during a start-up phase only of the module, after initial module power-on. Thereafter the adjustment is preferably not provided. Moreover, preferably the power control circuitry is formed from components already existing in the module, such as a voltage regulator and module controller such as a microprocessor, a feedback input of the voltage regulator having a control signal applied thereto from the microprocessor whereby to effect said adjustment. The microprocessor also controls other components within the module in a conventional manner. The use of the existing components, however, allows for more efficient use of board space, an important consideration in high-density designs.

The power control circuitry preferably, within embodiments of the invention, adjusts the supply voltage according to a programmable profile. Such a feature allows for the supply voltage to be controlled to achieve a desired result, such as to, for example, control in-rush current more effectively, and/or prevent damage to components within the module.

Preferably, the power control circuitry adjusts the power supplied to the module over a time period of about 50 ms.

Some implementations or embodiments may incorporate or implement fewer of the aspects or features noted in the foregoing summaries.

BRIEF DESCRIPTION OF THE DRAWINGS

Further features and advantages of the present invention will become apparent from the following description of embodiments thereof, presented by way of example only, and with reference to the accompanying drawings, wherein like reference numerals refer to like parts, and wherein.

DESCRIPTION OF THE EMBODIMENTS

For the purposes of understanding the embodiments of the invention to be described, it will be helpful first of all to describe a conventional prior art pluggable module, to which the invention may be applied.

Figure 1:
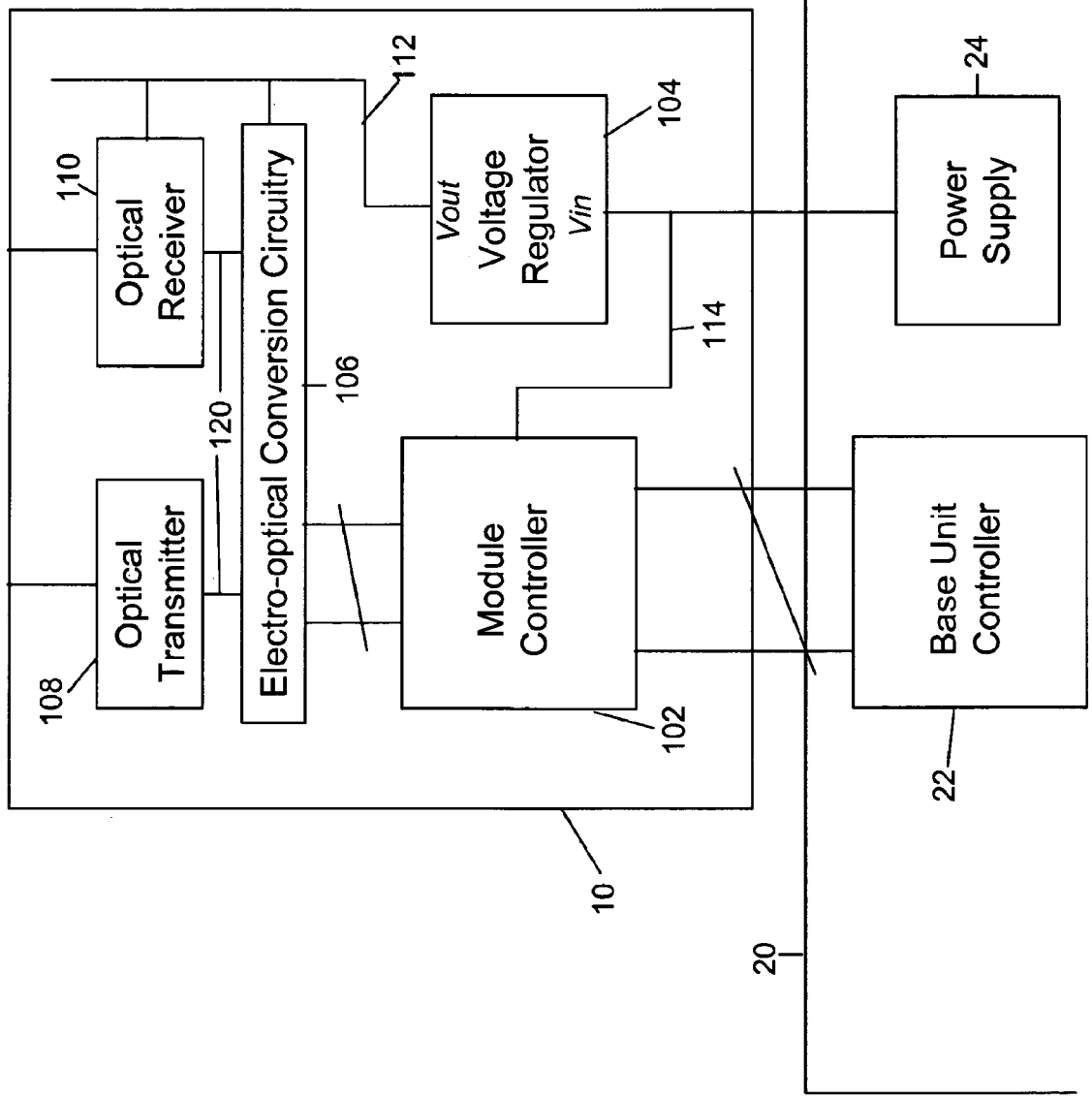
FIG. 1 is a block diagram of a pluggable module of the prior art.

With the above in mind, FIG. 1 is a block diagram of a prior art conventional pluggable module. Embodiments of the invention to be described particularly relate to pluggable electrical or optical transceiver modules, being modules which are releasably connectable to a router or switch in a communications network. Optical transceivers include electro-optical conversion devices (such as lasers and photodiodes) in order to convert data to be transmitted over the communications network between the electrical and optical domains to allow transmission over an optical fiber.

As shown in FIG. 1, a pluggable optical module 10 comprises a module controller 102 which would typically be a microprocessor. Additionally provided is a voltage regulator 104, which receives a supply voltage from a power supply 24 located in a base unit 20, when the pluggable optical module 10 is releasably connected thereto. The voltage regulator 104 provides an output supply voltage $V_{out}$ on output supply voltage line 112. To perform its function of the transmission and receipt of optical signals an optical transmitter 108 is provided, as well as an optical receiver 110. The optical transmitter 108 and the optical receiver 110 are connected via control lines 120 to electro-optical conversion circuitry 106. The electro-optical conversion circuitry 106 communicates with the module controller 102 via an appropriate bus. As shown, the electro-optical conversion circuitry 106, and optical receiver 110 receive power from the voltage supply line 112 output by the voltage regulator 104. Additionally, the optical transmitter 108 would also receive power from this line, although this is not shown in the diagram. Voltage is supplied to a Vin input of the voltage regulator 104, as well as to the module controller, from the power supply 24 in the base unit, via a power supply line 114. The module controller 102 communicates via a plurality of control and communication lines to a base unit controller 22 within the base unit 20. FIG. 1 illustrates the pluggable optical module 10 releasably connected to the base unit 20, such that the power supply 24 within the base unit supplies power to the voltage regulator 104 and the module controller via line 114, and control and communications data can be passed between the module controller 102 and the base unit controller 22, via the plurality of control lines therebetween.

In operation the pluggable optical module 10 would receive an optical signal, most likely via an optical fiber, into the optical receiver 110, and this optical signal would be converted by a photodiode and related electro-optical conversion circuitry 106 to a corresponding signal in the electrical domain. The received data would then be passed to the module controller 102, and then forwarded via the control and communication lines between the module controller and the base unit controller 22 so as to forward the received data into the base unit 20. As noted previously, the base unit would typically be a router or switch provided in a communications network. To transmit data, the data to be transmitted will be passed by the base unit controller 22 to the module controller 102, and from there to the electro-optical conversion circuitry 106, including a laser, which converts the data into the optical domain, i.e. an optical beam, for transmission over an optical fiber via the optical transmitter 108. Power is typically supplied to the transmitter 108 (e.g. a TOSA, in the case of an optical transceiver), receiver 110 (a ROSA, in the case of an optical transceiver) and protocol processing or conversion circuitry 106 by the voltage regulator 104, which itself draws electrical power from the power supply 24 provided in the system base unit, when the pluggable optical module is releasably connected thereto. Thus far described, the pluggable module 10 is conventional.

Figure 2:
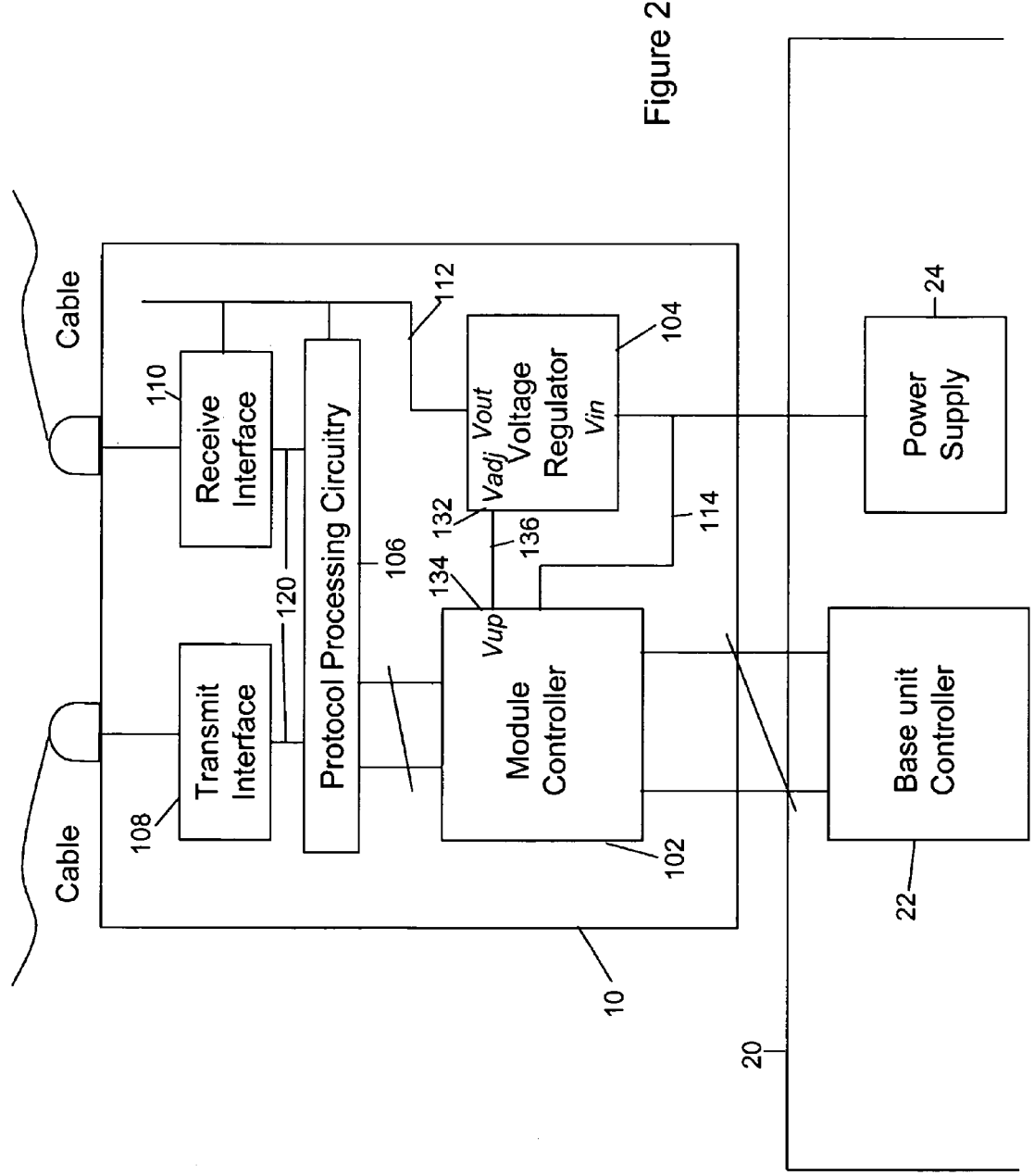
FIG. 2 is a block diagram of a pluggable module according to a first embodiment of the present invention.

FIG. 2 illustrates a first embodiment of the present invention, based upon the pluggable optical module 10 of FIG. 1. In addition to optical transceiver modules described in the prior art, the present invention is also embodied in purely electrical transceiver modules. Such modules perform the function of plugging into a standard electrical connector in a host unit, such as supporting the Infiniband protocol, and converting it into a different electrical communications protocol that is more suitable for longer communications links. An example of such a module is the ECX-7700-XEN, four channel CX4 XENPAK copper transceiver of Emcore Corporation, which provides an interface from an industry standard media dependent interface (MDI) electrical socket for CX4, Infiniband, and Fibre Channel communications lines in a host unit to four full duplex 3.125 Gigabaud transmit and receive channels over copper cable. Other examples of transceiver modules perform protocol conversion, serial to parallel data conversion (e.g. a serial 10 Gigabit data stream into four 3.125 Gigabit data streams), or other high speed data streams into a greater number of lower speed data streams.

As noted previously, pluggable modules 10 when first inserted into the base units 20 and powered up can be subject to a large in-rush current, while, for example, high capacity capacitors within the module 10 charge up. Such a large in-rush current can have two different deleterious effects, firstly affecting the power supply 24 located in the base unit 20, such that it experiences a substantial voltage drop which may affect other pluggable modules connected to the unit, or, in a worst case, cause system shut down. Additionally, the excessive in-rush current into the module 10 on connection can also damage components within the pluggable module 10, and in particular the electro-optical components such as the optical transmitter 108 (which would typically be a laser component). Therefore, in order to overcome these problems embodiments of the invention provide a pluggable module which has power control circuitry which controls the supply voltage to the components within the module during an initial start up phase after the module has been connected. Typically, the supply voltage is controlled to ramp up from zero to a desired output level, over a sufficient period of time so as to prevent excessive in-rush current occurring. By controlling the supply voltage to components in the module, then the in-rush current can also be controlled.

Embodiments of the invention provide such power control using existing components already present within the pluggable optical module, or the base unit, thus doing away with the need for dedicated power control chips, as are proposed in the prior art. Moreover, within embodiments of the invention the voltage supply to the components in the module can be controlled in accordance with a fully programmable profile, allowing a start-up profile for the supply voltage to be programmed in order to meet any requirement. For example, the profile can be arranged so as to prevent power supply glitches in the base unit power supply 24, or alternatively or additionally, to prevent damage to components in the module. Different ramp up profiles can be used, depending upon the objective to be achieved. Such profiles may be stored in the microprocessor, or in read only memory associated with the microprocessor.

In view of the above, FIG. 2 illustrates a pluggable module 10 according to a first embodiment of the present invention, which is substantially identical to the pluggable module 10 of FIG. 1, but with several important additions to allow for the control of the voltage supply to the components on line 112.

More particularly, according to the first embodiment of the invention the module controller 102 is provided with a control output 134, which is connected via a control line 136 to an adjustment input 132 of the voltage regulator 104. The module controller outputs a control signal $V_{up}$ onto the control line 136 from the control output 134, and which is received on the adjustment input 132 of the voltage regulator. The voltage regulator 104 is arranged such that the output voltage $V_{out}$ output on supply line 112 is controllable in response to the voltage $V_{up}$ received on control line 136 at adjustment input 132. The relationship between the output voltage $V_{out}$ output on control line 112 and the control signal $V_{up}$ received at adjustment input 132 via control line 136 is generally inverse, in that a high value for $V_{up}$ will lead to a zero or low value of $V_{out}$. As $V_{up}$ is reduced the voltage $V_{out}$ output on supply line 112 is increased, up to the point where the desired supply voltage for the components supplied via supply line 112 is reached.

Because the control signal $V_{up}$ is output by the module controller 102, which is typically a microprocessor provided with a digital to analog converter, the control signal $V_{up}$ can be controlled to provide a predetermined profile for the output voltage $V_{out}$ during the start up phase. This facility becomes available in embodiments of the invention because of the versatility of the control signal $V_{up}$ being provided via the existing module controller 102, which is typically a single microprocessor, but may be several integrated circuits performing different functions. Further details as to the operation of the voltage regulator 104, and example profiles of start up voltage which may be obtained, will be described later.

Figure 3:
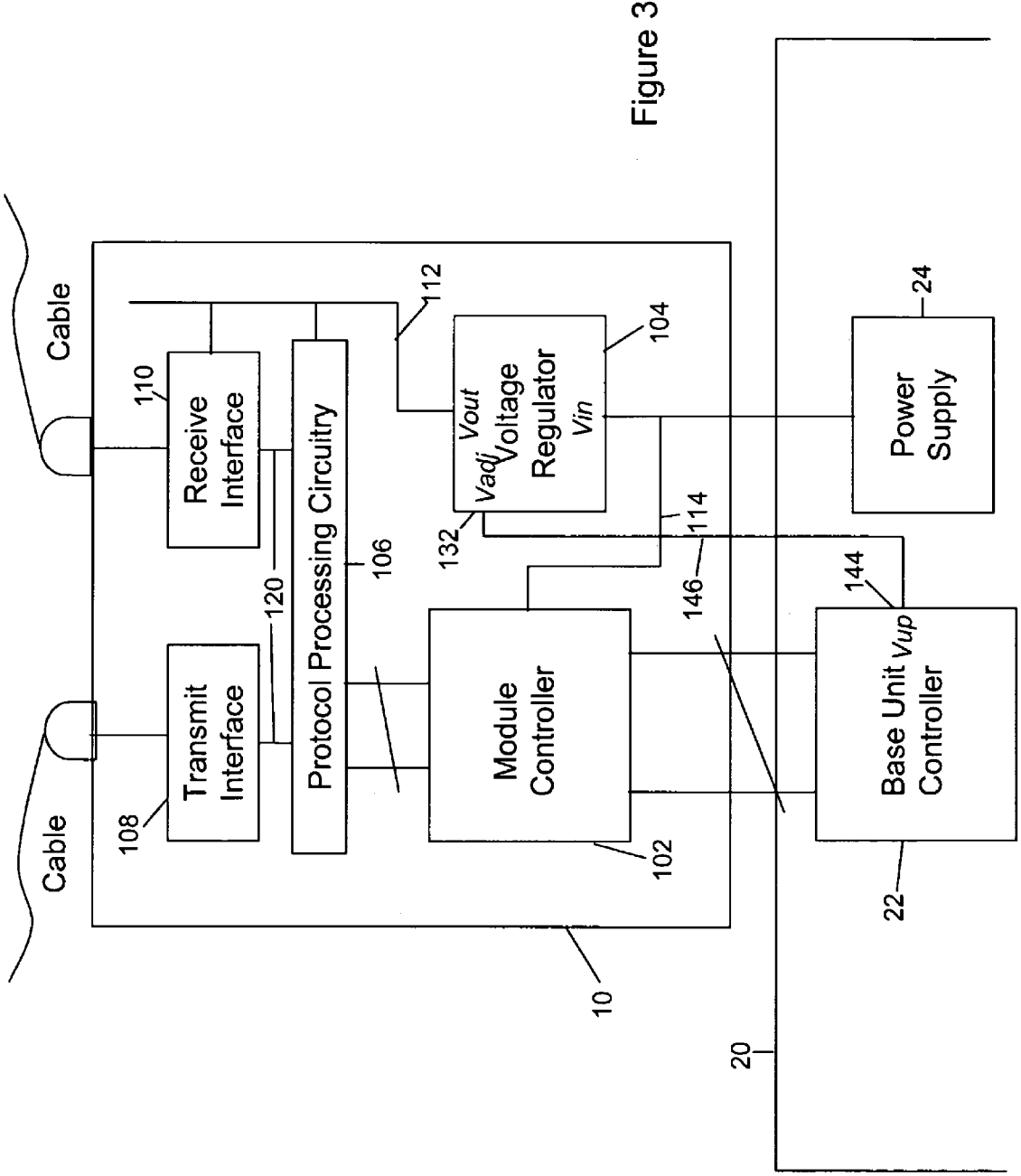
FIG. 3 is a block diagram of a pluggable module according to a second embodiment of the present invention.

FIG. 3 illustrates a second embodiment of the present invention, again based on the pluggable electrical or electro-optical module 10 of FIG. 1. Here, the voltage regulator 104 is provided with adjustment input 132, but instead of receiving a control signal from the module controller 102, as in the first embodiment, within the second embodiment the control signal $V_{up}$ is received from a control output 144 of the base unit controller 122, via a control line 146. Here, the operation is substantially the same as previously described in respect of the first embodiment, except that it is the base unit controller 22 which provides the control signal $V_{up}$ to the voltage regulator 104. Otherwise, the generally inverse relationship between $V_{up}$ and $V_{out}$ is maintained, and the base unit controller 22 may apply any profile to $V_{up}$ during the start up phase after the pluggable module 10 has been connected, so as to achieve any desired output profile of $V_{out}$ on line 112. As mentioned previously, suitable start up profiles can be chosen so as to prevent excessive in-rush currents, as well as to prevent damage to components within the pluggable module 10.

Further details of the operation of the voltage regulator, and how the output voltage $V_{out}$ may be controlled will now be described with reference to FIGS. 4 and 5.

Figure 4:
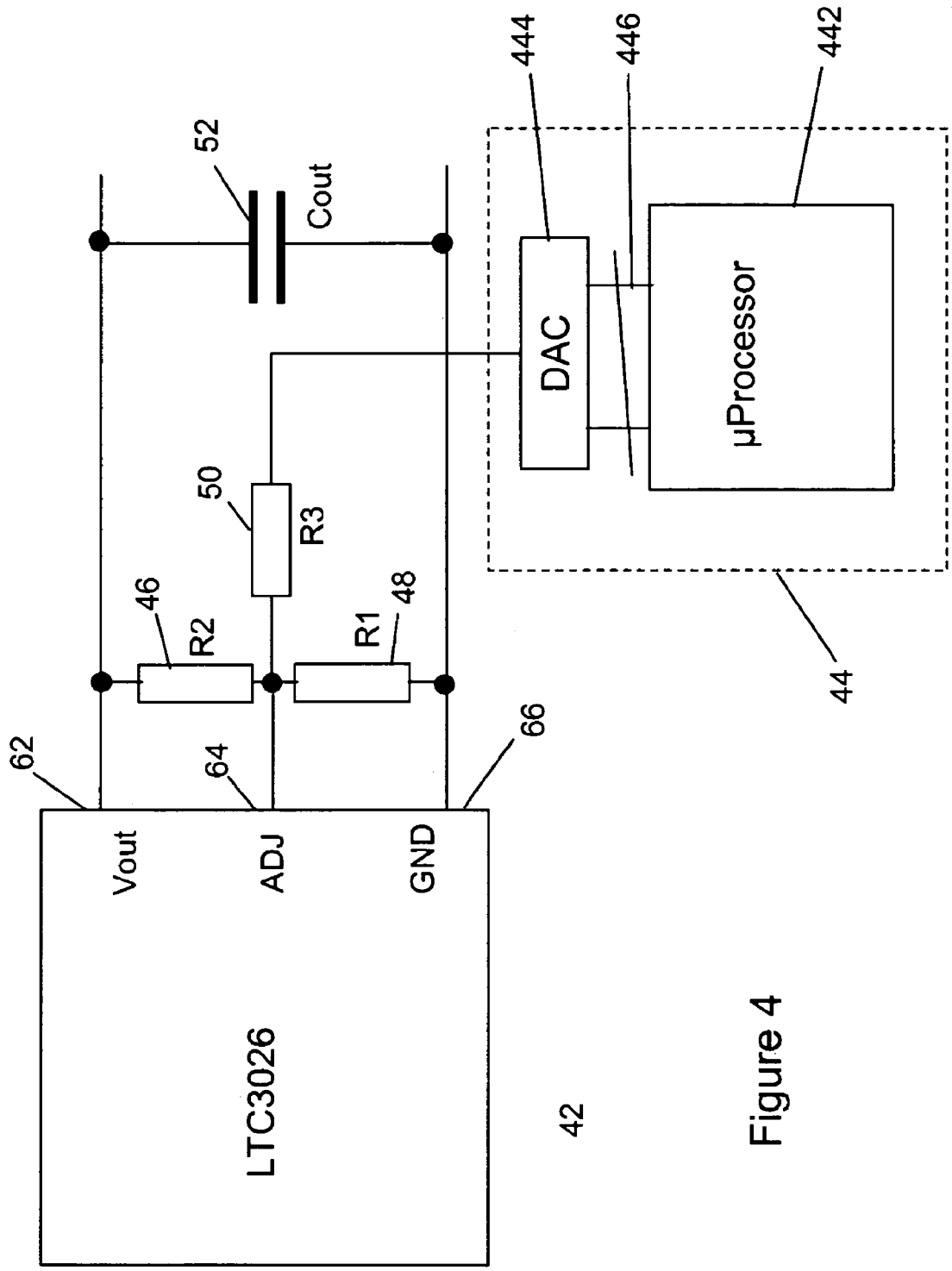
FIG. 4 is a circuit diagram of a circuit arrangement employed in either the first or second embodiments of the present invention.

More particularly, FIG. 4 illustrates a voltage regulator chip, in this case LTC 3026, available from Linear Technology Corporation, and which may be used as the voltage regulator 104 of the first and second embodiments of the invention. The voltage regulator 42 has a primary output 62 at which the supply voltage $V_{out}$ is output, as well as an adjustment input 64 through which the output voltage $V_{out}$ is fed back into the voltage regulator, to allow for closed loop adjustment. A ground pin 66 is also provided. The output voltage $V_{out}$ of the voltage regulator is set by choosing values for two resistors arranged in a potential divider configuration, with the middle node between the two resistors being connected to the adjustment input 64. More particularly a first resistor R2 46 and a second resistor R1 48 are connected in series between the $V_{out}$ node 62 and the ground node 66. The adjustment input 64 is connected to the middle node between the two resistors, as shown in FIG. 4. An output capacitor $V_{out}$ 52 is provided between the $V_{out}$ node and the ground node, to smooth the supplied voltage. The arrangement thus far described is the conventional arrangement for the LTC 3026 voltage regulator, and the output voltage $V_{out}$ is chosen by selecting suitable values for R2 and R1 in accordance with the following equation:—

$$V_{out} = V_{adj}\left(1 + \frac{R2}{R1}\right) \quad \text{Equation 1}$$

where:

$$V_{adj} = 0.4 \text{ volts} \quad \text{Equation 2}$$

In particular, the LTC 3026 operates internally to control $V_{out}$ such that the voltage $V_{adj}$ at a the adjustment input is maintained to 0.4 volts. Thus, $V_{out}$ can be selected by appropriate selection of the resistor values R2 over R1, and by substituting the value 0.4 for the value $V_{adj}$ in equation 1 above.

Thus far described the configuration and operation of the voltage regulator is conventional. In accordance with embodiments of the invention, a controller 44 which may either be the module controller 102 or the base unit controller 22, depending on the embodiment (as described previously), is provided which comprises a microprocessor 442, and a digital to analog converter 444. Parallel data lines 446 are provided between the microprocessor and the digital to analogue converter for the provision of data control words to the digital to analog converter 444 for conversion to analogue to form the control signal. The output of the digital to analog converter is connected to the adjustment input 64 via a resistor R3 50. The output from the digital to analog converter is the control signal $V_{up}$.

Figure 5:
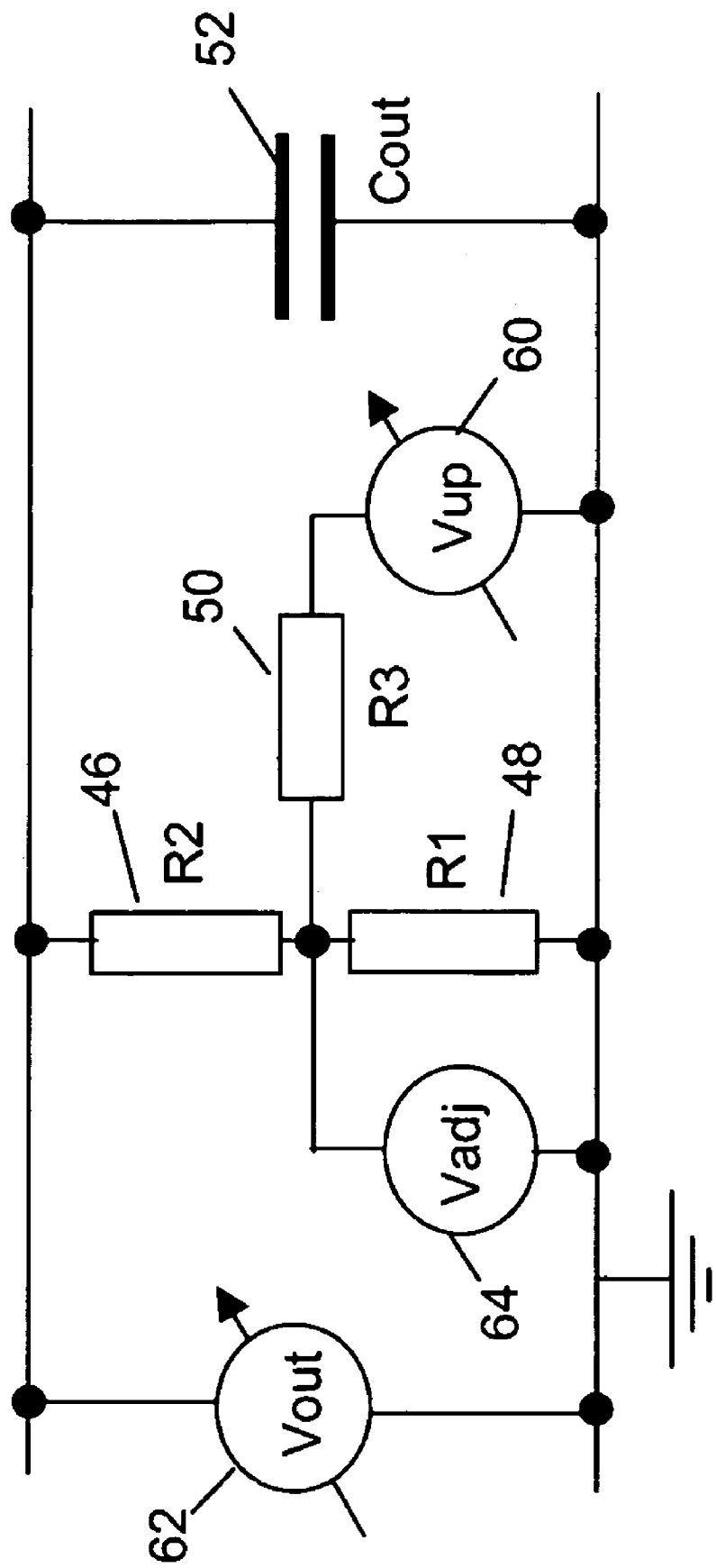
FIG. 5 is an equivalent circuit showing the voltage supplies in the circuit of FIG. 4.

The equivalent circuit to FIG. 4 illustrating the voltage sources present is shown in FIG. 5. Here, $V_{up}$ is represented by voltage source 60, which is adjustable under the control of the microprocessor. Voltage source 62 representing $V_{out}$ is the voltage to be controlled, and voltage source 64 represents $V_{adj}$ which is maintained at a constant 0.4 volts, within the LTC 3026 chip. Analysing FIG. 5 using superposition theorem and in view of equation 1 above, it can be shown that:

$$V_{out} = R2\left(\frac{V_{adj}}{R2} + \frac{V_{adj}}{R1} + \frac{V_{adj}}{R3} - \frac{V_{up}}{R3}\right) \quad \text{Equation 3}$$

or else zero if the formula goes to negative.

Figure 6:
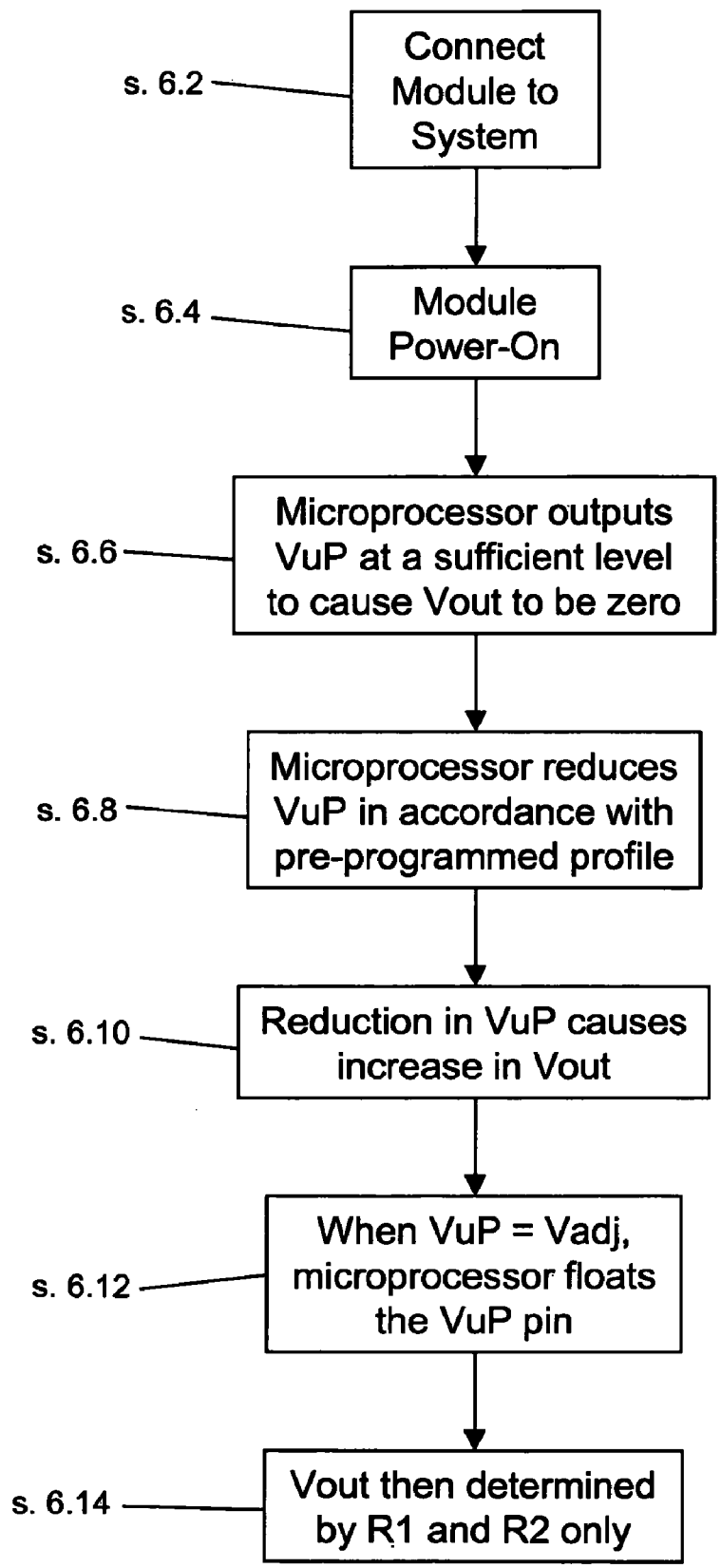
FIG. 6 is a flow diagram illustrating the steps performed by the embodiments of the present invention.

In view of the above, it can be seen that given that $V_{adj}$ is fixed at 0.4 volts, and the values of R1 and R2 can be chosen to give the desired value of $V_{up}$, in accordance with equation 1 previously, then the only variable element in equation 3 above is $V_{up}$, the relationship being such that $V_{out}$ varies inversely with $V_{up}$. FIG. 6 illustrates a flow diagram describing how the microprocessor 442 can control $V_{up}$ to give the required supply voltage $V_{out}$.

More particularly, at step 6.2 the pluggable module 10 is connected to the base unit 20, such that the base unit power supply 24 then supplies power to the pluggable module 10 thus causing, at step 6.4, module power on. As will be seen, the module controller 102, which is typically a microprocessor, receives power directly from the base unit power supply 24, and hence can start to boot up.

To prevent current in-rush, and with reference to FIG. 4, the controller 44, which is either the module controller 102 in the first embodiment, or the base unit controller 22 in the second embodiment, immediately outputs, at step 6.6, the control signal $V_{up}$ at a sufficient level to cause $V_{out}$ to be zero, in accordance with equation 3 set out above. It will be appreciated that the voltage level $V_{up}$ to achieve this result will depend on the values chosen for R2, R1, and R3. Therefore, the level chosen for $V_{up}$ initially to cause $V_{out}$ to be zero should be chosen taking these values into account.

$V_{up}$ may be held at the level which gives a $V_{out}$ of zero for a certain amount of time, for example, in the first embodiment, the amount of time required for the microprocessor in the module controller 102 to boot up. At step 6.8 the microprocessor then reduces the control signal $V_{up}$ in accordance with a pre-programmed profile, with each reduction causing, at step 6.10 a corresponding increase in $V_{out}$, in accordance with equation 3 given previously. Example profiles are shown in FIGS. 7 and 8, described next.

Figure 7:
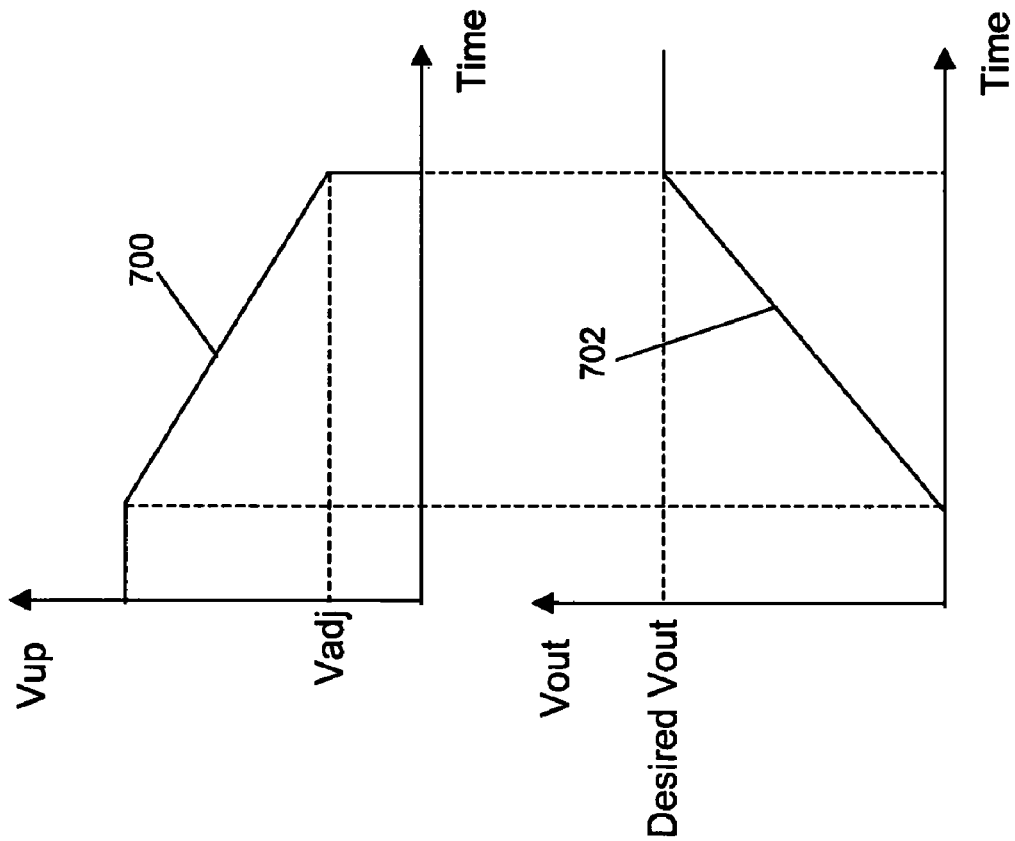
FIG. 7 is a diagram illustrating a first pre-programmed profile which can be used in embodiments of the present invention.

More particularly, FIG. 7 illustrates how $V_{up}$ 700 may be held at a high level for a particular amount of time, and then gradually but continuously reduced until it becomes equal to the voltage $V_{adj}$, in which case the microprocessor then floats the control output, at step 6.12. Floating the control output means that the voltage output $V_{out}$ from the voltage regulator becomes dependent on R1 and R2 only, with the relationship determined by equation 1 discussed previously. It will be seen from FIG. 7 that as the control signal $V_{up}$ is reduced, then the output voltage $V_{out}$ 702 correspondingly increases up to the desired level, when $V_{up} = V_{adj}$.

Figure 8:
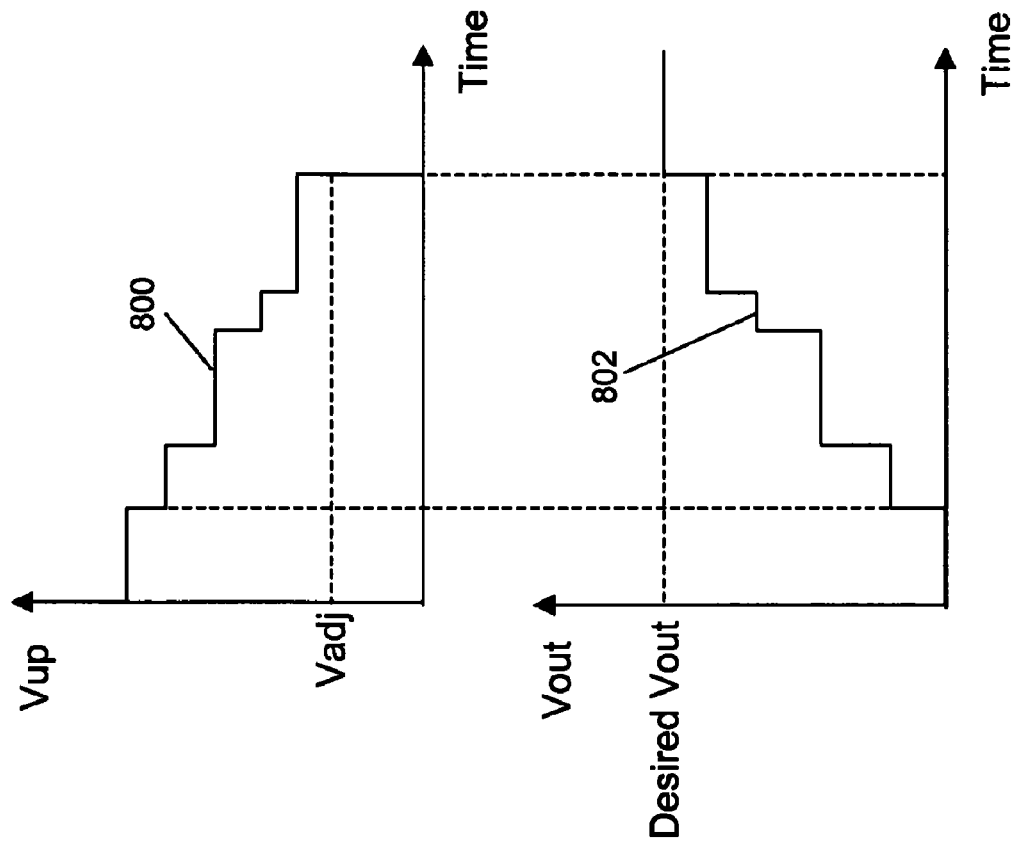
FIG. 8 is a diagram illustrating a secondary programmable profile which can be used with embodiments of the present invention.

FIG. 8 illustrates an alternative profile for the control signal $V_{up}$ 700, and the corresponding profile obtained for the supply voltage $V_{out}$ 802. In particular, the profile 800 in FIG. 8 is a step profile, wherein $V_{up}$ is reduced incrementally in steps, leading to corresponding incremental increases in $V_{out}$ up to the desired $V_{out}$ value. Again, when the control signal $V_{up}$ becomes equal to $V_{adj}$, the control pin is floated, thus removing the control signal completely leaving $V_{out}$ to be dependent on R1 and R2 only.

Please note that the profile of the control signal $V_{up}$, and hence the corresponding profile obtained from $V_{out}$ can be determined to be any profile necessary to achieve the desired result. In particular, it may be a steadily reducing profile such as in FIG. 7, or a step profile as shown in FIG. 8. Where a step profile is used, the steps may be of equal duration and variation, or may instead be unequal, as shown in FIG. 8. Additionally, the profile may be made in accordance with other mathematical functions, such as curves, ellipses, or the like, and may be a combination of step changes, continuous changes etc. In particular, as mentioned the profile may be chosen so as to achieve a desired result, which may be either to prevent damage to components within the module, prevent excessive in-rush current or voltage drops in the power supply, or combinations of any of these.

In terms of the period of time over which the control signal is output i.e. the period of time over which $V_{out}$ is increased up to the desired level, the period of time should be selected so as to be sufficiently slow to prevent the deleterious effects noted previously and which are present in the prior art. To this end, a preferred ramp-up time measured in tens of milliseconds (i.e. 10-100 ms) is preferred, and a ramp-up time of around 50 ms is particularly preferred.

Further modifications, substitutions, additions and/or rearrangements to the above described embodiments and falling within the spirit and/or scope of the underlying inventive concept will be apparent to the person skilled in the art to provide further embodiments of the invention, any and all of which are intended to be encompassed by the appended claims.

The invention claimed is:

1. A pluggable module for releasable connection to a base unit, the pluggable module being arranged to draw electrical power from a power supply in the base unit when connected thereto, the module comprising power control circuitry adapted to supply a supply voltage to at least a subset of components within the module according to a time-based programmable profile stored in a memory of a controller to gradually adjust the supply voltage to a desired value over time to avoid a substantial voltage drop or excessive current changes in the power supply, wherein the controller is configured to generate a control signal for input to the power control circuitry according to the time-based programmable profile, and the power control circuitry is adapted to supply the supply voltage to said at least a subset of components in an inverse relationship to the control signal, and wherein the power control circuitry include an adjustment input, a ground connection, and an output for outputting the supply voltage, the pluggable module further comprising:
   a first resistor coupled between the output and the adjustment input;
   a second resistor coupled between the adjustment input and the ground connection;
   a third resistor coupled between the adjustment input and the control signal from the controller; and
   a capacitor coupled between the output and the ground connection.

2. A pluggable module according to claim 1, further comprising components adapted for the conversion and transfer of information signals, wherein said base unit is an information system unit having a media dependent interface (MDI) electrical connector with signals in a CX4, Infiniband, or Fibre Channel format.

3. A pluggable module according to claim 2, wherein the module is a pluggable electrical module including serial to parallel conversion circuitry for converting information signals between a first electrical signal format and a second electrical signal format.

4. A pluggable module according to claim 2, wherein the module is a pluggable optical module including electro-optical conversion components for converting information between electrical and optical domains.

5. A pluggable module according to claim 1, wherein the power control circuitry adjusts said supply voltage during a start-up phase of said module after said module is powered on.

6. A pluggable module according to claim 1, wherein the controller is in the base unit.

7. A pluggable module according to claim 1, wherein the stored programmable profile is adapted to control the power control circuitry to incrementally increase said supply voltage up to a desired level for proper operation of the subset of components.

8. A pluggable module according to claim 7, wherein the stored programmable profile is further adapted to increase said supply voltage to said desired level over a period of substantially 50 milliseconds.

9. A pluggable module according to claim 1, wherein the power control circuitry comprises the controller and a voltage regulator, wherein the voltage regulator is configured to provide said voltage supply, wherein a control output of the controller is configured to output an adjustment control signal to an adjustment input of said voltage regulator to adjust said voltage supply, and wherein the controller is further configured to additionally control other components of said module.

10. A pluggable module according to claim 9, wherein the controller is a microprocessor provided with a digital to analogue converter, the output of which forms the control output.

11. A pluggable module according to claim 1, wherein the power control circuitry comprises a voltage regulator provided with an adjustment input, wherein the voltage regulator is configured to provide said voltage supply, and wherein the adjustment input of said voltage regulator is configured to receive an adjustment control signal from the controller provided within said base unit to adjust said voltage supply.

12. A pluggable module according to claim 1, wherein during a start-up phase, after said module is powered on, the controller is configured to generate the control signal at a level sufficient to cause the supply voltage to be zero, and wherein after the start-up phase, the controller is configured to reduce the level of the control signal according to the time-based programmable profile to cause an increase in the supply voltage.

13. A pluggable module according to claim 1, wherein the controller is configured to float the control signal when the supply voltage reaches a predetermined value.

14. A pluggable module according to claim 1, wherein the controller is configured to float the control signal when the supply voltage at the output of the power control circuitry is equal to the level of the control signal.

15. A pluggable module according to claim 14, wherein when the control signal is floated by the controller, the supply voltage is determined by values of the first resistor and the second resistor.

* * * * *